(12) United States Patent
Biskeborn et al.

(10) Patent No.: US 7,894,150 B2
(45) Date of Patent: Feb. 22, 2011

(54) ERROR COMPENSATION USING A RESERVE TRACK

(75) Inventors: Robert Glenn Biskeborn, Hollister, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 12/419,111

(22) Filed: Apr. 6, 2009

(65) Prior Publication Data

US 2010/0254036 A1      Oct. 7, 2010

(51) Int. Cl.
*G11B 27/36* (2006.01)
(52) U.S. Cl. .......................................... 360/31; 360/53
(58) Field of Classification Search ........................ None
See application file for complete search history.

(56) References Cited

U.S. PATENT DOCUMENTS

| | | | | |
|---|---|---|---|---|
| 3,803,552 A | * | 4/1974 | Barlow et al. | 714/700 |
| 3,812,531 A | * | 5/1974 | Hall | 360/26 |
| 4,357,702 A | * | 11/1982 | Chase et al. | 714/700 |
| 5,583,842 A | | 12/1996 | Wilson et al. | 369/54 |
| 5,822,142 A | | 10/1998 | Hicken | 360/53 |
| 5,835,930 A | | 11/1998 | Dobbek | 711/4 |
| 6,101,619 A | | 8/2000 | Shin | 714/710 |
| 6,336,197 B1 | | 1/2002 | Sasaki et al. | 714/710 |
| 6,778,359 B1 | * | 8/2004 | Iwama | 360/129 |
| 2002/0035653 A1 | | 3/2002 | Oeda et al. | 710/34 |

OTHER PUBLICATIONS

Stanislav Semakin, "Studying and modeling the influence of the remapping technology on hard disk drives" University of Joensuu; Department of Computer Science; Master's Thesis; May 22, 2006.

\* cited by examiner

*Primary Examiner*—Jason C Olson
(74) *Attorney, Agent, or Firm*—Zilka-Kotab, PC

(57) ABSTRACT

In one embodiment, a method includes simultaneously writing tracks of data on a magnetic medium in a first direction using less than all available writers in an array of magnetic writers. The method also includes determining that an error has occurred when writing one of the tracks and terminating writing with the writer associated with the track on which the error occurred. In addition, the method includes simultaneously writing tracks of data on the magnetic medium in the first direction using a previously unused writer in the array of magnetic writers.

17 Claims, 7 Drawing Sheets

ERROR COMPENSATION USING A RESERVE TRACK

BACKGROUND

The present invention relates to data storage systems, and more particularly, this invention relates to storing data on tape drives while compensating for poor performing data tracks.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement generally entrains a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect efficient signal transfer, and so that the read element is in near contact with the tape to provide effective coupling of the magnetic field from the tape to the read element.

Currently, data, such as a customer's data, is parsed into data sets (CQ's) of a certain size. The data set is split into 16 channels (in the case of a 16 channel drive) to be written by 16 writers to the media. As the data is being written, 16 readers in line with the writers read back the written data to confirm that the data has been written successfully. However, should a reader or writer fail or degrade, the data on that channel will not be read back or written successfully. If one channel is not written correctly, the entire data set (CQ) will not be written correctly.

As a result of this problem, the entire data set has to be rewritten in another area of the media (CQRW). Too many data set rewrites can cause the drive to lose capacity and data rate. Also, currently, tape drives have no way of compensating for a single dead track. Furthermore, in some cases, if a reader is dead, this dead reader can cause the entire drive to lose 50% of its capacity. Current products have 32 readers, and a problem with even one of these readers can cause the drive to lose almost 50% of its writing capacity. This causes the drive to be considered a failed drive and the drive would have to be replaced. Even if the track failure rate is 0.1% or 1 in 1000 tracks, this rate of track failure would lead to a 3% failure rate in drives. When tape drives and related products transition to 64 readers, this failure rate jumps to over 6%. Accordingly, a more efficient method of dealing with dead or poorly performing readers, writers, and/or tracks would be greatly beneficial.

SUMMARY

In one embodiment, a method includes simultaneously writing tracks of data on a magnetic medium in a first direction using less than all available writers in an array of magnetic writers. The method also includes determining that an error has occurred when writing one of the tracks and terminating writing with the writer associated with the track on which the error occurred. In addition, the method includes simultaneously writing tracks of data on the magnetic medium in the first direction using a previously unused writer in the array of magnetic writers.

In another embodiment, a system includes an array of magnetic writers. The system also includes logic for simultaneously writing tracks of data on a magnetic medium using less than all available writers in the array of magnetic writers, and for determining that an error has occurred when writing one of the tracks. In addition, the system includes logic for terminating writing with the writer associated with the track on which the error occurred, and for simultaneously writing tracks of data on the magnetic medium using a previously unused writer in the array of magnetic writers.

A method, according to another embodiment, includes simultaneously writing tracks of data on a magnetic medium using an array of magnetic writers. The method also includes determining that an error has occurred when writing one of the tracks and terminating writing with the writer associated with the track on which the error occurred. In addition, the method includes altering information in packets of the data to reflect the new number of data tracks being written.

In another embodiment, a system includes an array of magnetic writers. The system also includes logic for simultaneously writing tracks of data on a magnetic medium using the array of magnetic writers, and for determining that an error has occurred when writing one of the tracks. In addition, the system includes logic for terminating writing with the writer associated with the track on which the error occurred, and for altering information in packets of the data to reflect the new number of data tracks being written.

Any of these embodiments may be implemented in a magnetic data storage system (e.g., tape drive system, etc.) which may include a magnetic head, a drive mechanism for passing a magnetic medium (e.g., recording tape, etc.) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
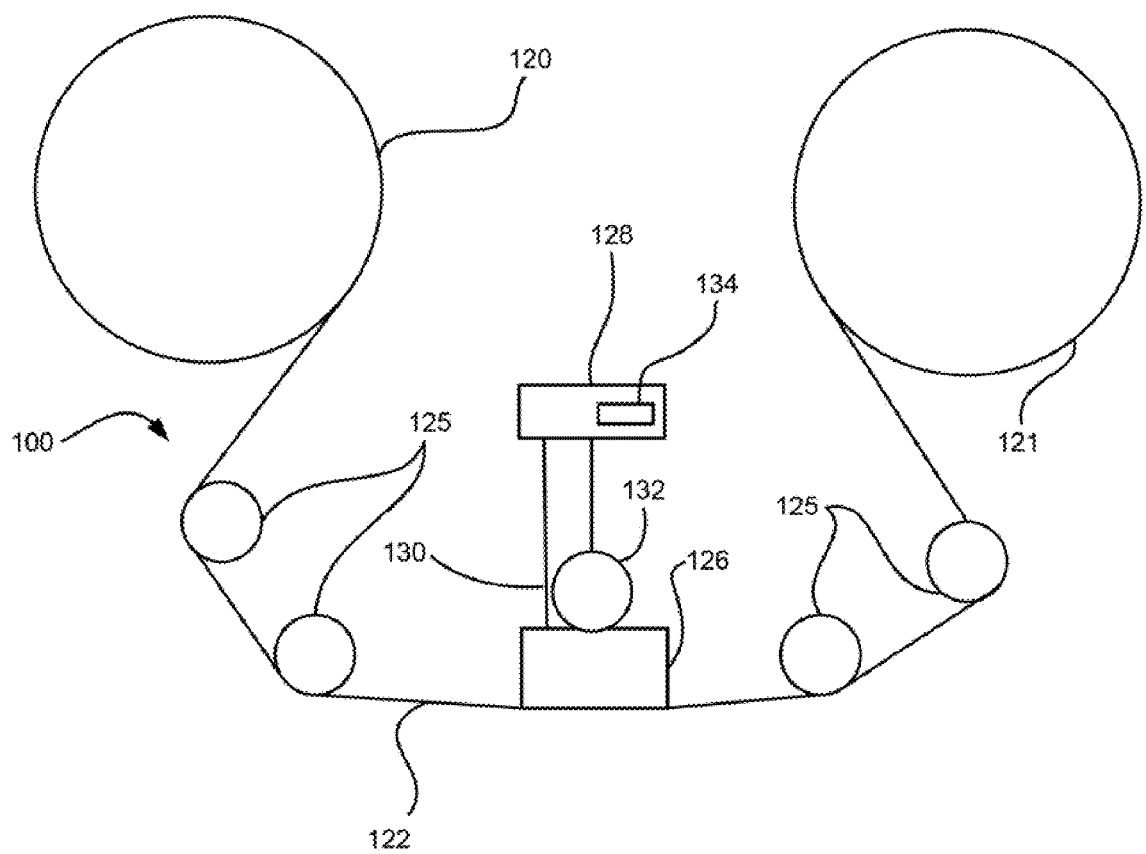
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a method comprises simultaneously writing tracks of data on a magnetic medium in a first direction using less than all available writers in an array of magnetic writers; determining that an error has occurred when writing one of the tracks; terminating writing with the writer associated with the track on which the error occurred; and simultaneously writing tracks of data on the magnetic medium in the first direction using a previously unused writer in the array of magnetic writers.

In another general embodiment, a system comprises an array of magnetic writers; logic for simultaneously writing tracks of data on a magnetic medium using less than all available writers in the array of magnetic writers; logic for determining that an error has occurred when writing one of the tracks; logic for terminating writing with the writer associated with the track on which the error-occurred; logic for simultaneously writing tracks of data on the magnetic medium using a previously unused writer in the array of magnetic writers.

In another general embodiment, a method comprises simultaneously writing tracks of data on a magnetic medium using an array of magnetic writers; determining that an error has occurred when writing one of the tracks; terminating writing with the writer associated with the track on which the error occurred; and altering information in packets of the data to reflect the new number of data tracks being written.

In another general embodiment, a system comprises an array of magnetic writers; logic for simultaneously writing tracks of data on a magnetic medium using the array of magnetic writers; logic for determining that an error has occurred when writing one of the tracks; logic for terminating writing with the writer associated with the track on which the error occurred; and logic for altering information in packets of the data to reflect the new number of data tracks being written.

In some embodiments, compensation for poor performing or dead tracks may be provided. The use of a reserve channel in the head can provide this compensation. It is rare for a magnetic head to have more than 1 outlier track that cannot be compensated for. During normal operation, a data set may be divided among all the other channels. For example, in a 16 channel drive, the data set may be divided into 15 channels. Should an outlier track develop, the drive algorithm typically first tries to compensate for the misbehaving track, e.g., use at least one error correction method known in the art. However, if that compensation attempt fails, the drive may shut that channel off and redirect all the data that is supposed to go into that channel into the reserve channel. Effectively, according to these embodiments, the drive may remain in 15 channel operation with no or minimal loss in capacity and/or data rate.

In more embodiments, the data set may be divided amongst all the channels. In these embodiments, no reserve track is available, but the drive has the capability of performing a header modification. The header is the part of the data packet that allows the data to be combined correctly. For example, if a 16 channel head is being used, the header describes how the drive can reassemble all 16 channels into the original data set. By modifying the header information appropriately, the drive can also compensate for a misbehaving track. In the scenario where a single track goes bad or is poorly performing, the drive can shut down the poor performing channel and switch from 16 channel operation to 15 channel operation. This switch may require modifying the header info so that during readback, the drive knows to only read 15 channels of data, instead of 16 channels, and knows how to recombine the data from the 15 channels.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
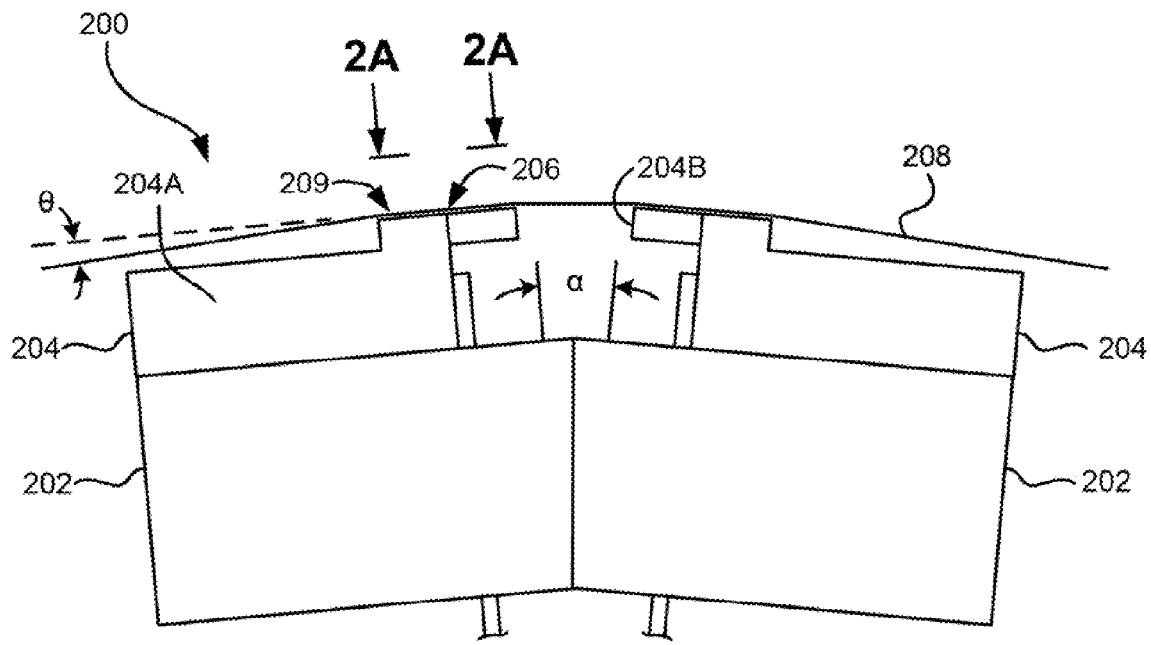
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap comprising elements 206 such as readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
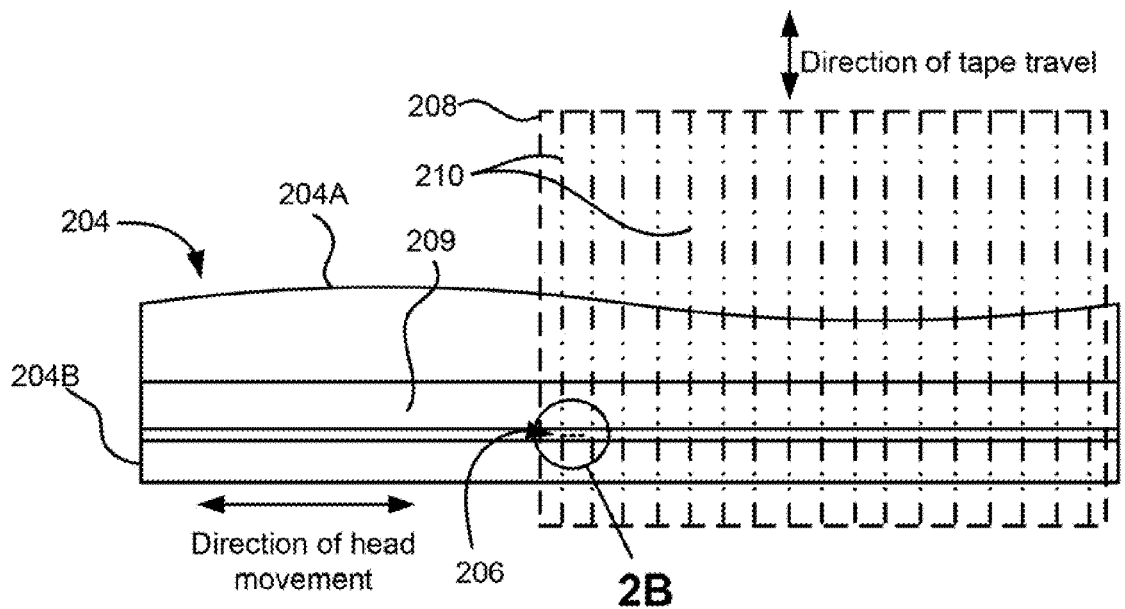
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4-22 data bands, e.g., with 16 data bands and 17 servo tracks 210, as shown in FIG. 2A on a one-half inch wide tape 208. The data bands are defined between servo tracks 210. Each data band may include a number of data tracks, for example 96 data tracks (not shown). During read/write operations, the elements 206 are positioned within one of the data bands. Outer readers, sometimes called servo readers, read the servo tracks 210. The servo signals are in turn used to keep the elements 206 aligned with a particular track during the read/write operations.

Figure 2B:
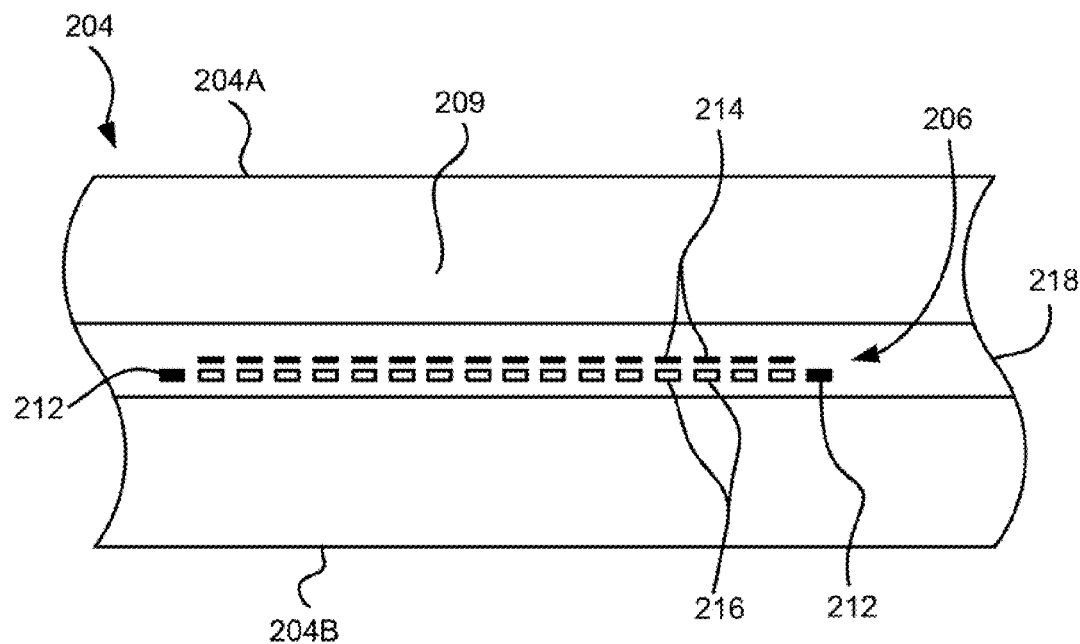
FIG. 2B is a detailed view taken from Circle 2B of FIG. 2A.

FIG. 2B depicts a plurality of read and/or write elements 206 formed in a gap 218 on the module 204 in Circle 2B of FIG. 2A. As shown, the array of elements 206 includes, for example, 16 writers 214, 16 readers 216 and two servo readers 212, though the number of elements may vary. Illustrative embodiments include 8, 16, 32, and 64 elements 206 per array. A preferred embodiment includes 32 readers per array and/or 32 writers per array. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of elements 206 may be readers or writers only, and the arrays may contain one or more servo readers 212. As noted by considering FIGS. 2 and 2A-B together, each module 204 may include a complementary set of elements 206 for such things as bi-directional reading and writing, read-while-write capability, backward compatibility, etc.

Figure 2C:
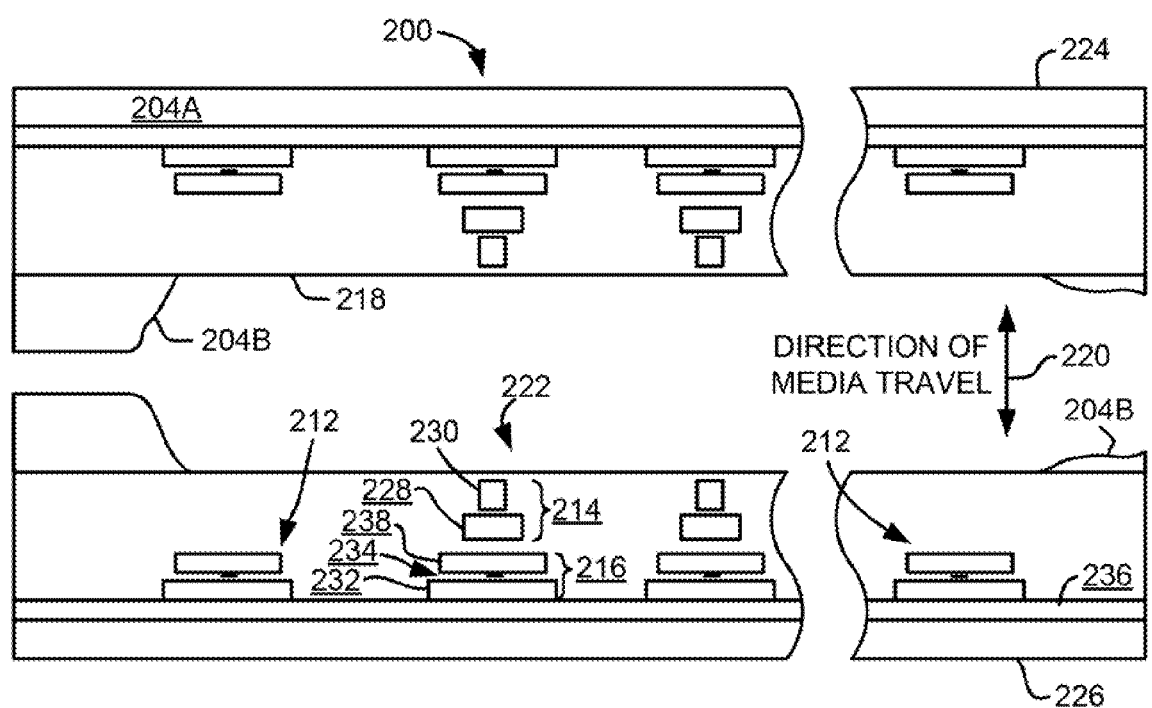
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3A:
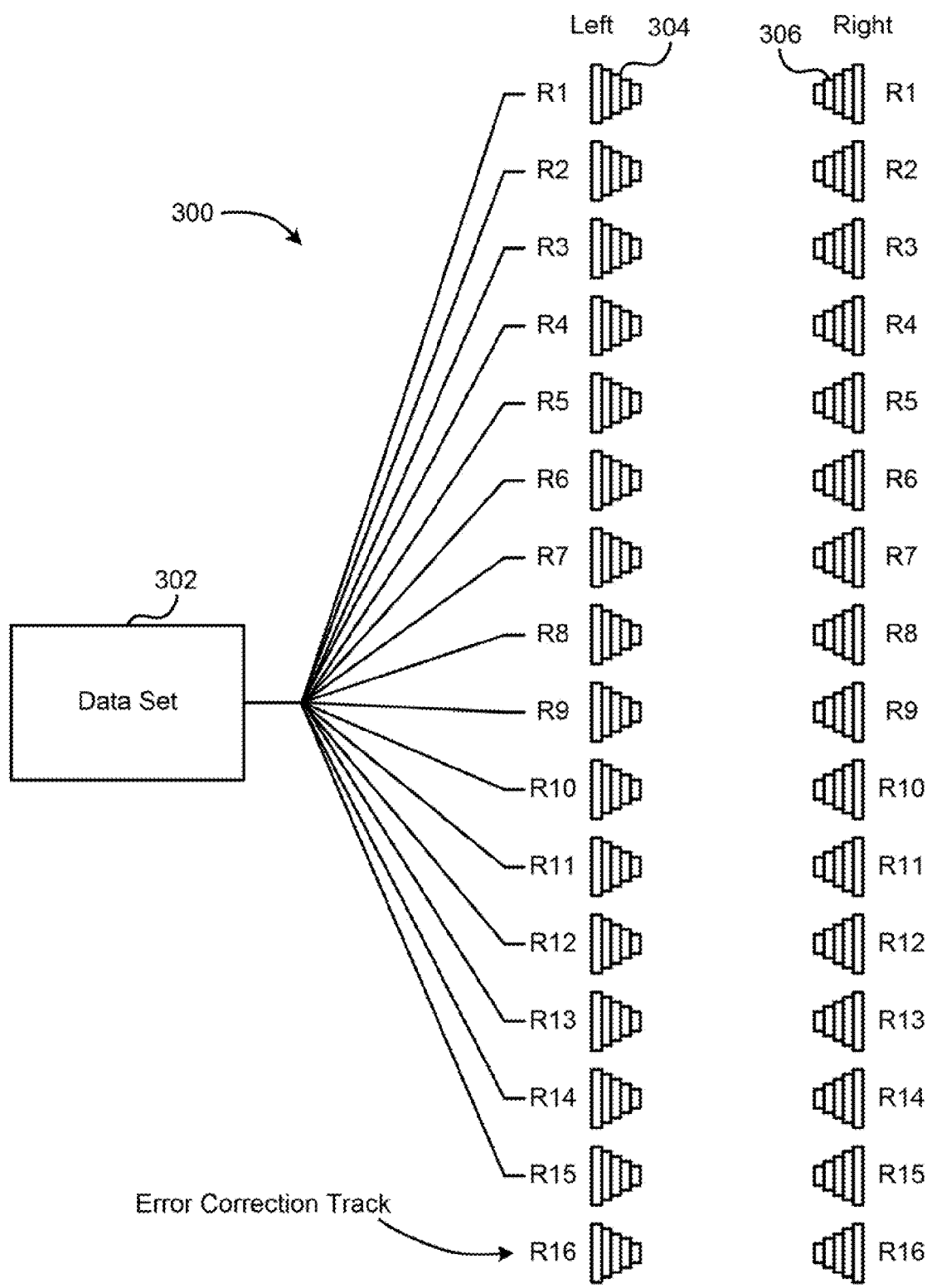
FIG. 3A shows a system that can be used to correct for error in a written data track according to one embodiment.
Figure 3B:
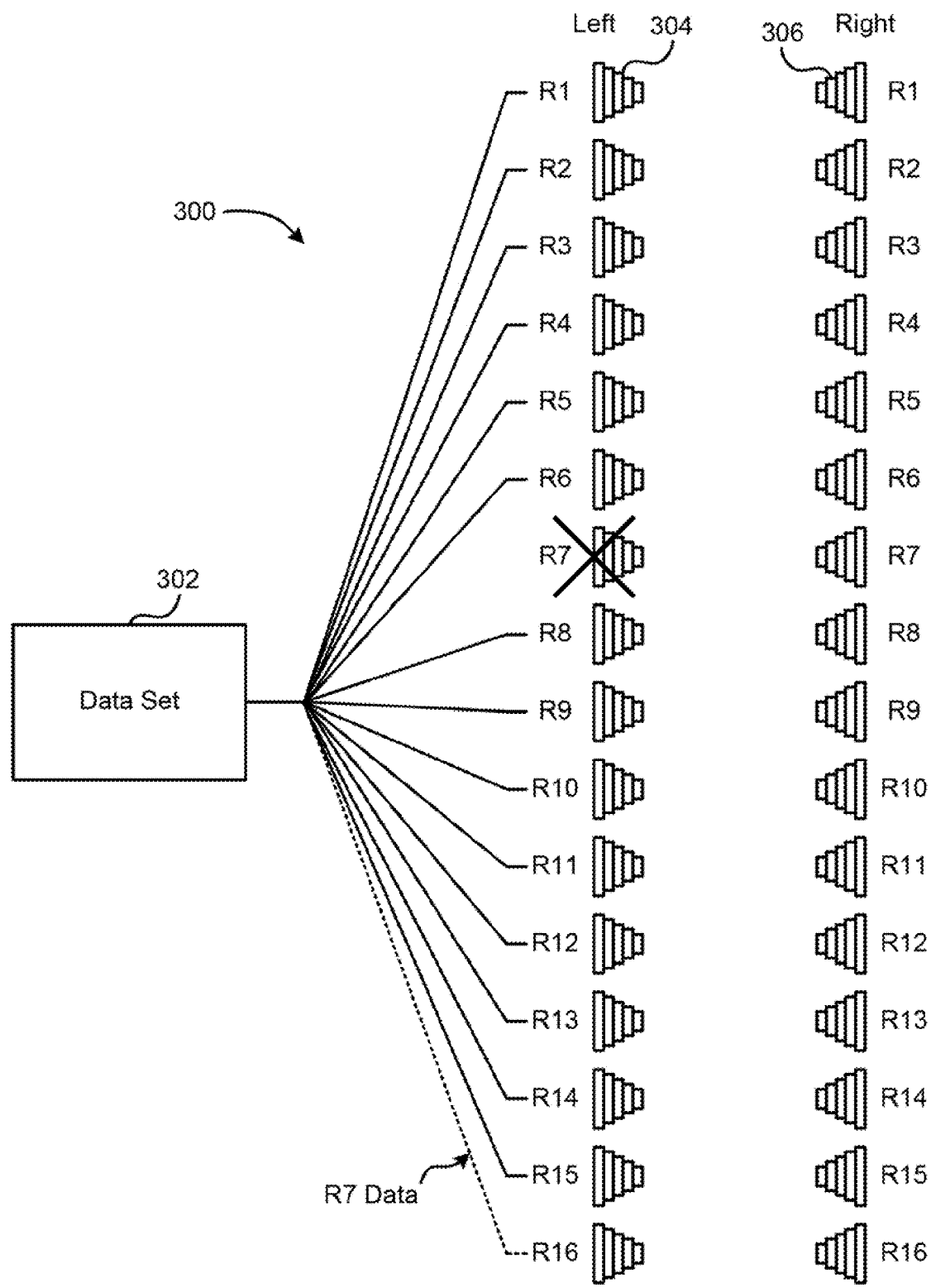
FIG. 3B shows a system that can be used to correct for error in a written data track according to one embodiment.

Now referring to FIGS. 3A and 3B, error correction using a reserve track is shown according to some embodiments. In FIG. 3A, a data set 302 may be divided up into 15 tracks (R1 through R15). A left writer 304 and a right writer 306 may be used to write tracks onto a magnetic medium, such as a magnetic tape. A method may comprise simultaneously writing tracks of data on a magnetic medium in a first direction using less than all available writers in an array of magnetic writers. As shown in FIG. 3A, the writer assigned to track 16 is not being used under normal operation. The method may further comprise determining that an error has occurred when writing one of the tracks where the error may be a single error such as a dead channel, or a series of errors resulting in diminished performance. Also, the method may include terminating writing with the writer associated with the track on which the error occurred and simultaneously writing tracks of data on the magnetic medium in the first direction using a previously unused (at least during the current write operation) writer in the array of magnetic writers.

For example, referring to FIG. 3B, if an error is detected on track 7, then writing with writer R7 may be terminated and the data that would normally be sent to writer R7 may be sent instead to unused writer R16 assigned to track 16, and therefore no data will be lost.

In some embodiments, the array of magnetic writers may be formed on a common substrate and are preferably aligned along a straight line.

In some more embodiments, the error may be a malfunction of the writer associated with the track on which the error occurred. For example, in FIG. 3B, writer R7 may have malfunctioned, which could have resulted in errors on track 7. In even more embodiments, the error may be a malfunction of a reader reading the data just written by the writer associated with the track on which the error occurred.

In some approaches, the method may further comprise attempting to compensate for the error using an error correction algorithm before terminating writing with the writer associated with the track on which the error occurred, and not terminating writing with the writer associated with the track on which the error occurred if the error is compensated for.

In some more approaches, the data being sent to the writer associated with the track on which the error occurred may be redirected to the previously unused writer after terminating writing with the writer associated with the track on which the error occurred.

In some embodiments, the method described above may be included in a system. For example, the system may include an array of magnetic writers and logic for simultaneously writing tracks of data on a magnetic medium using less than all available writers in the array of magnetic writers. In addition, the system may include logic for determining that an error has occurred when writing one of the tracks where the error may be a single error such as a dead channel, or a series of errors resulting in diminished performance. Also, the system may include logic for terminating writing with the writer associated with the track on which the error occurred and logic for simultaneously writing tracks of data on the magnetic medium using a previously unused (at least during the current write operation) writer in the array of magnetic writers. The writer which is unused may change during a series of writing operations, so that one writer is not used any less than the other writers, such that the writing load is evenly distributed across all writers in the writer array.

In some embodiments, the system may further comprise a drive mechanism for passing a magnetic recording tape over the array of writers, and a controller in communication with the array of writers. In these embodiments, the system may be capable of performing writing operations on several areas of the magnetic recording tape.

Figure 4A:
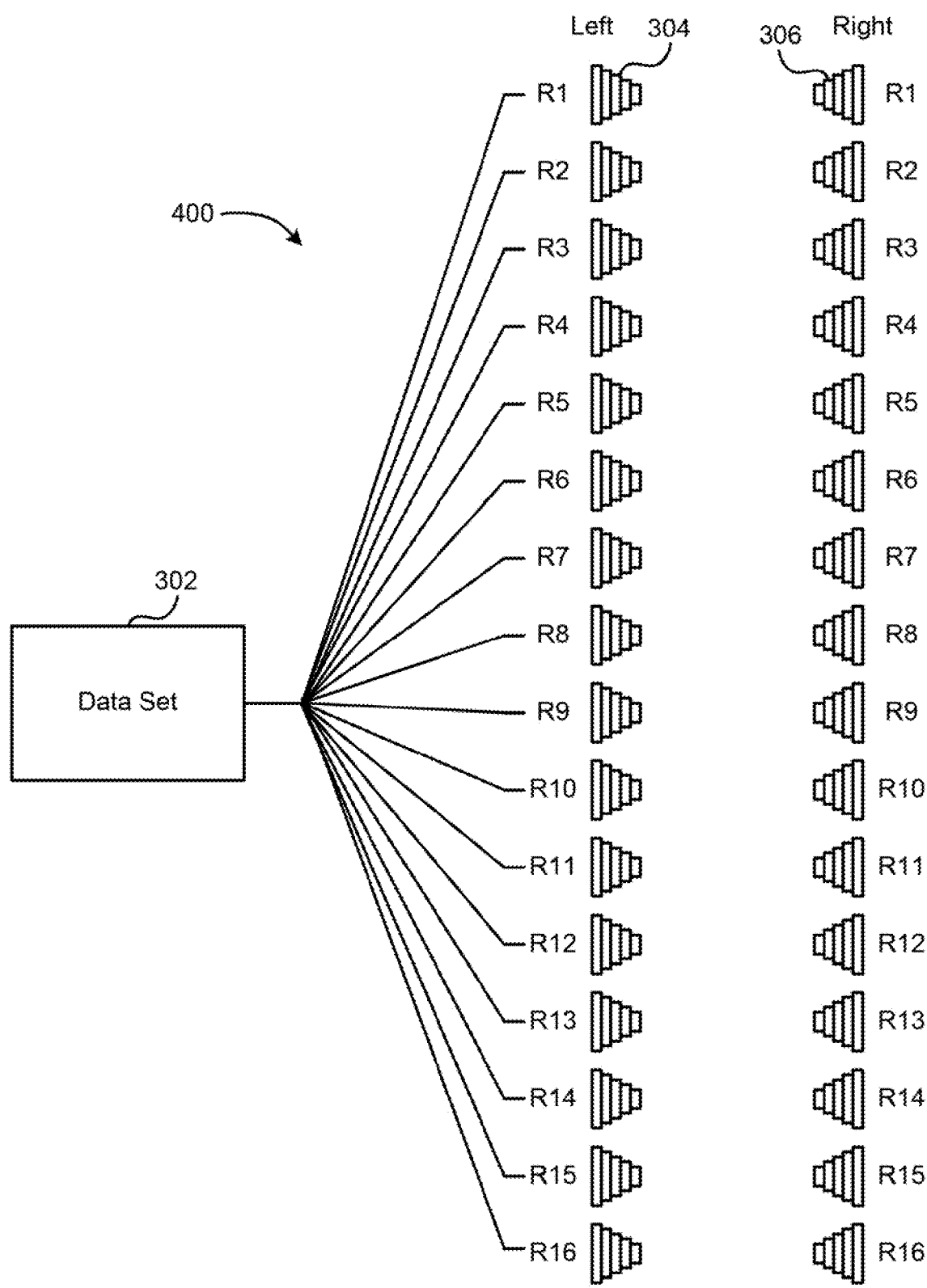
FIG. 4A shows a system that can be used to correct for error in a written data track according to one embodiment.
Figure 4B:
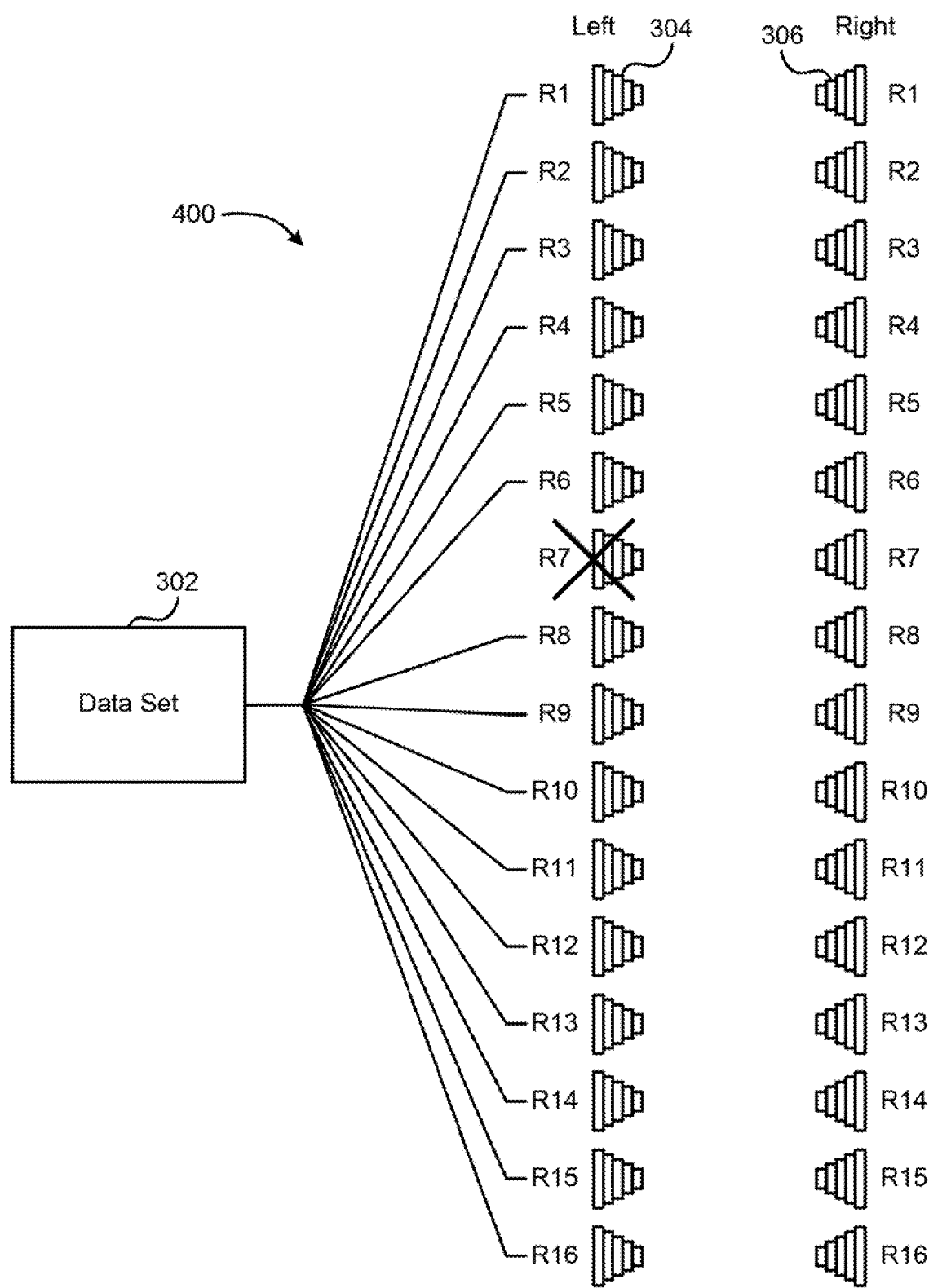
FIG. 4B shows a system that can be used to correct for error in a written data track according to one embodiment.

Now referring to FIGS. 4A and 4B, a method may be described. The method may comprise simultaneously writing tracks of data on a magnetic medium using an array of magnetic writers, as shown in FIG. 4A. Also, the method may comprise determining that an error has occurred when writing one of the tracks where the error may be a single error such as a dead channel, or a series of errors resulting in diminished performance.

Now referring to FIG. 4B, the method may further comprise terminating writing with the writer associated with the track on which the error occurred and altering information in packets of the data written by the other writers to reflect the new number of data tracks being written.

For example, as shown in FIG. 4B, if an error is detected in one of the written data tracks, i.e., track R7, then the data that would normally be written onto track R7 can be spread to other data tracks, and the header information may be changed so that when the data is read back from the magnetic media, it can be read correctly.

In some embodiments, the array of magnetic writers may be formed on a common substrate. In some more embodiments, all writers in the array may initially write the tracks of data.

In some approaches, the error may be a malfunction of the writer associated with the track on which the error occurred. In other approaches, the error may be a malfunction of a reader reading the data just written by the writer associated with the track on which the error occurred.

In some more embodiments, the method may further comprise attempting to compensate for the error using an error correction algorithm before terminating writing with the writer associated with the track on which the error occurred, and not terminating writing with the writer associated with the track on which the error occurred if the error is compensated for.

In some more embodiments, the information altered in the packets of the data may be header information. For example, the header information may be altered in such a way as to accommodate for an error in one of the written data tracks.

In some embodiments, the method described above may be included in a system. The system may include an array of magnetic writers and logic for simultaneously writing tracks of data on a magnetic medium using the array of magnetic writers. In addition, the system may include logic for determining that an error has occurred when writing one of the tracks where the error may be a single error such as a dead channel, or a series of errors resulting in diminished performance. Also, the system may further comprise logic for terminating writing with the writer associated with the track on which the error occurred and logic for altering information in packets of the data to reflect the new number of data tracks being written.

In some further embodiments, the system may include a drive mechanism for passing a magnetic recording tape over the array of writers and a controller in communication with the array of writers.

It will be clear that the various features of the foregoing methodologies may be combined in any way, creating a plurality of combinations from the descriptions presented above.

Also, while various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
simultaneously writing tracks of data on a magnetic medium in a first direction using less than all available writers in an array of magnetic writers;
determining that an error has occurred when writing one of the tracks;
terminating writing with the writer associated with the track on which the error occurred; and
simultaneously writing tracks of data on the magnetic medium in the first direction using a previously unused writer in the array of magnetic writers.

2. The method of claim 1, wherein the array of magnetic writers are formed on a common substrate.

3. The method of claim 1, wherein the error is a malfunction of the writer associated with the track on which the error occurred.

4. The method of claim 1, wherein the error is a malfunction of a reader reading the data just written by the writer associated with the track on which the error occurred.

5. The method of claim 1, further comprising attempting to compensate for the error using an error correction algorithm before terminating writing with the writer associated with the track on which the error occurred, and not terminating writing with the writer associated with the track on which the error occurred if the error is compensated for.

6. The method of claim 1, wherein the data being sent to the writer associated with the track on which the error occurred is redirected to the previously unused writer after terminating writing with the writer associated with the track on which the error occurred.

7. A system, comprising:
an array of magnetic writers;
logic for simultaneously writing tracks of data on a magnetic medium using less than all available writers in the array of magnetic writers;
logic for determining that an error has occurred when writing one of the tracks;
logic for terminating writing with the writer associated with the track on which the error occurred;
logic for simultaneously writing tracks of data on the magnetic medium using a previously unused writer in the array of magnetic writers.

8. The system as recited in claim 7, further comprising:
a drive mechanism for passing a magnetic recording tape over the array of writers; and
a controller in communication with the array of writers.

9. A method, comprising:
- simultaneously writing tracks of data on a magnetic medium using an array of magnetic writers;
- determining that an error has occurred when writing one of the tracks;
- terminating writing with the writer associated with the track on which the error occurred; and
- altering information in packets of the data to reflect the new number of data tracks being written.

10. The method of claim 9, wherein the array of magnetic writers are formed on a common substrate.

11. The method of claim 9, wherein all writers in the array initially write the tracks of data.

12. The method of claim 9, wherein the error is a malfunction of the writer associated with the track on which the error occurred.

13. The method of claim 9, wherein the error is a malfunction of a reader reading the data just written by the writer associated with the track on which the error occurred.

14. The method of claim 9, further comprising attempting to compensate for the error using an error correction algorithm before terminating writing with the writer associated with the track on which the error occurred, and not terminating writing with the writer associated with the track on which the error occurred if the error is compensated for.

15. The method of claim 9, wherein the information altered in the packets of the data is header information.

16. A system, comprising:
- an array of magnetic writers;
- logic for simultaneously writing tracks of data on a magnetic medium using the array of magnetic writers;
- logic for determining that an error has occurred when writing one of the tracks;
- logic for terminating writing with the writer associated with the track on which the error occurred; and
- logic for altering information in packets of the data to reflect the new number of data tracks being written.

17. The system as recited in claim 16, further comprising:
- a drive mechanism for passing a magnetic recording tape over the array of writers; and
- a controller in communication with the array of writers.

* * * * *